(12) United States Patent
Komine

(10) Patent No.: US 6,746,023 B2
(45) Date of Patent: Jun. 8, 2004

(54) COLLET

(75) Inventor: Tsuyoshi Komine, Hyogo (JP)

(73) Assignee: Big Alpha Co., Inc., Hyogo (JP)

( * ) Notice: Subject to any disclaimer, the term of this patent is extended or adjusted under 35 U.S.C. 154(b) by 42 days.

(21) Appl. No.: 10/174,496

(22) Filed: Jun. 18, 2002

(65) Prior Publication Data

US 2003/0052462 A1 Mar. 20, 2003

(30) Foreign Application Priority Data

Sep. 18, 2001 (JP) ........................ 2001-283977
Nov. 8, 2001 (JP) ........................ 2001-343760

(51) Int. Cl.[7] ............... B23B 31/12; B23B 31/00
(52) U.S. Cl. ........................ 279/46.7; 279/20
(58) Field of Search ............ 279/20, 43.7, 46.7, 279/52, 157; 408/56

(56) References Cited

U.S. PATENT DOCUMENTS

| | | | | |
|---|---|---|---|---|
| 2,608,414 A | * | 8/1952 | Montgomery | 279/51 |
| 3,539,193 A | | 11/1970 | Parsons | |
| 5,028,178 A | * | 7/1991 | Ronen | 409/136 |
| 5,311,654 A | * | 5/1994 | Cook | 29/447 |
| 5,378,091 A | * | 1/1995 | Nakamura | 409/132 |
| 5,904,451 A | * | 5/1999 | Gerber | 408/56 |
| 5,975,817 A | * | 11/1999 | Komine | 409/136 |

FOREIGN PATENT DOCUMENTS

| | | |
|---|---|---|
| CH | 684938 | 2/1995 |
| EP | 0618030 | 10/1994 |
| EP | 0781616 | 7/1997 |
| GB | 482766 | 4/1938 |

OTHER PUBLICATIONS

European Search Report for European Application No. EP 02 25 4298, dated Nov. 24, 2003 (2 pages).

* cited by examiner

*Primary Examiner*—Daniel W. Howell
*Assistant Examiner*—Brian D. Walsh
(74) *Attorney, Agent, or Firm*—Wolf, Greenfield & Sacks, P.C.

(57) ABSTRACT

The present invention provides a collet capable of efficiently supplying a cooling fluid such as a cutting fluid to a tool and thereby realizing satisfactory cooling by adjusting the flow velocity of the cooling fluid according to the diameter of the tool held by the collet. The collet comprises: a collet body for inserting the shank of the tool, a slot formed at least from the tool insertion side, and a weir member inserted into the slot. The weir member extends from a position recessed from the inner surface of the collet body in a direction closer to the outer surface of the collet body and reaches the outer surface thereof, and a gap S through which the fluid can flow is formed between the weir member and the inner surface of the collet body.

20 Claims, 8 Drawing Sheets

COLLET

BACKGROUND OF THE INVENTION

1. Field of the Invention

The present invention relates to a collet which is used to hold a tool, and which is inserted into a tool holder mounted to a main spindle of, for example, a machine tool.

2. Description of the Related Art

In tool machines such as lathes, drilling machines, or milling machines, collets have been used as a part of holders for holding tools such as drills or end mills. This type of collet generally comprises a collet body, into which the shank of the tool is inserted, and a slot formed in the collet body.

It is necessary to cool these tools continuously in order to suppress heat generated at the time of processing (cutting) works. The tools are sometimes lubricated in order to obtain better workability. As a general method for such cooling and lubrication, a water-soluble coolant or a cutting fluid (cooling fluid) such as oil is supplied to the tool. As an example of the method for supplying the cutting fluid to a tool, a tool with a through hole extending in its lengthwise direction is used and the tool is cooled by causing the cutting fluid to flow through the through hole. This method is intended to supply the cutting fluid to the through hole in the tool efficiently by providing a weir member at a specified position of the slot in order to prevent the cutting fluid from flowing out from the slot formed in the collet body.

When a tool is used which has no through hole as described above, there is a general method for cooling the tool by supplying the cutting fluid between the collet and the tool held by the collet by utilizing the slot formed in the collet body.

In the method of cooling the tool by supplying the cutting fluid to the tool by utilizing the slot formed in the collet body, if the tool held by the collet has a small diameter relative to the outside diameter of the collet body, a cross-sectional area of the slot in its radial direction becomes large and, therefore, the flow velocity of the cutting fluid is reduced accordingly. As a result, there is a fear that the cutting fluid may become easily dispersed and it may become difficult to supply the cutting fluid to the cutting edge of the tool in a concentrated manner. Particularly, there is a fear that even if the cutting fluid is supplied at high pressure, the cutting fluid may be dispersed due to centrifugal force at the time of high-speed rotation before it reaches the cutting edge of the tool.

SUMMARY OF THE INVENTION

The present invention is aimed at improving the conventional collets as described above. It is an object of this invention to provide a collet which can efficiently supply a cooling fluid such as a cutting fluid to the tool by adjusting the flow velocity of the fluid according to the diameter of the tool held by the collet, thereby enabling satisfactory cooling.

In order to achieve the above-described object, the present invention provides collet for holding a tool by inserting the shank of the tool into a center hole of the collet mounted in a tool holder for supplying a fluid to the tool, and the collet comprises: a collet body for inserting the shank of the tool therein; a slot formed at least from the tool insertion side of the collet body; and a weir member inserted into the slot. The weir member extends from a position recessed from the inner surface of the collet body in a direction closer to the outer surface of the collet body, thereby forming a gap for the fluid to flow therethrough between the weir member and the inner surface of the collet.

Concerning the collet having the above-described structure, the end face of the weir member inserted into the slot on the side facing the inner surface of the collet body is located at a position recessed from the inner surface of the collet body in a direction closer to the outer surface of the collet body, thereby forming a gap between the weir member and the inner surface of the collet body, through which the fluid flows. Accordingly, by changing the cross-sectional area of the gap arbitrarily by adjusting the position of the end face of the weir member on the side facing the inner surface of the collet body according to the diameter of the tool held by the collet, it is possible to adjust the flow velocity of the cooling fluid such as the cutting fluid.

The cross-sectional area of the gap in the radial direction of the collet body can be determined by adjusting the length of the weir member. In other words, the cross-sectional area of the gap can be relatively decreased by extending the length of the weir member, while the cross-sectional area of the gap can be relatively increased by shortening the length of the weir member. Concerning the collet of this invention, a weir member insertion hole can be formed in the slot in the radial direction of the collet body, and the weir member can be inserted into the weir member insertion hole.

Moreover, at one end of the weir member on the side facing the inner surface of the collet body, an inclined plane can be formed which is inclined from the outer surface of the collet body to the inner surface thereof toward the tool insertion side. This inclined plane guides the cooling fluid to the cutting edge of the tool, thereby enabling more efficient cooling of the tool.

Furthermore, regarding the collet of this invention, a weir member insertion hole can be formed in the slot, which is inclined from the outer surface of the collet body to the inner surface thereof toward the tool insertion side, and the weir member can be inserted into the weir member insertion hole. This structure allows the cooling fluid to be guided to the cutting edge of the tool, thereby enabling more efficient cooling of the tool.

The weir member can be located in the vicinity of the tool insertion side. By so locating the weir member, the cooling fluid can be guided to the cutting edge of the tool more easily, thereby enabling the cooling of the tool with further efficiency.

Moreover, the weir member can be made of an elastic element.

The slot can be formed to have different widths at a position closer to the base-end side than to the weir member and at a position closer to the top-end side than to the weir member. This structure makes it possible to adjust the flow velocity of the cooling fluid more effectively.

The collet of this invention may be a straight collet or a tapered collet.

The weir member can be located in a nut mounting part of the collet body of the tapered collet. The weir member can also be located in a tapered part of the collet body.

DETAILED DESCRIPTION OF THE PREFERRED EMBODIMENT

Collets according to preferred embodiments of this invention are described with reference to the attached drawings.
(Embodiment 1)

Figure 1:
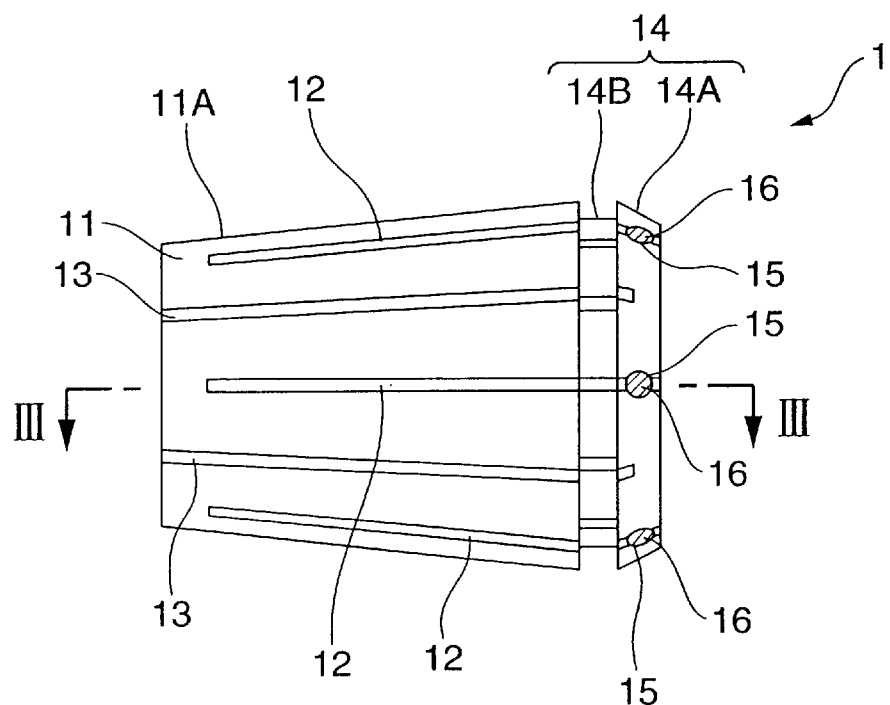
FIG. 1 is a side view of a collet according to Embodiment 1 of the present invention.
Figure 2:
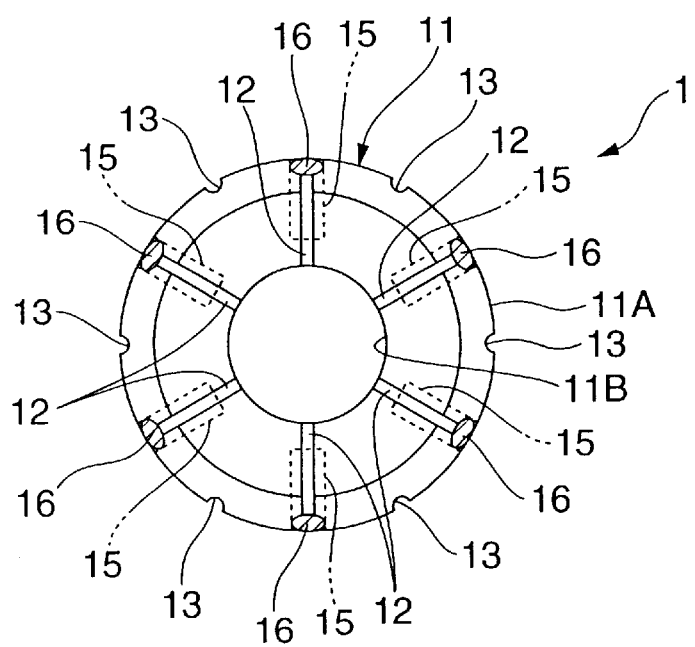
FIG. 2 is a front view of the collet of FIG. 1.
Figure 3:
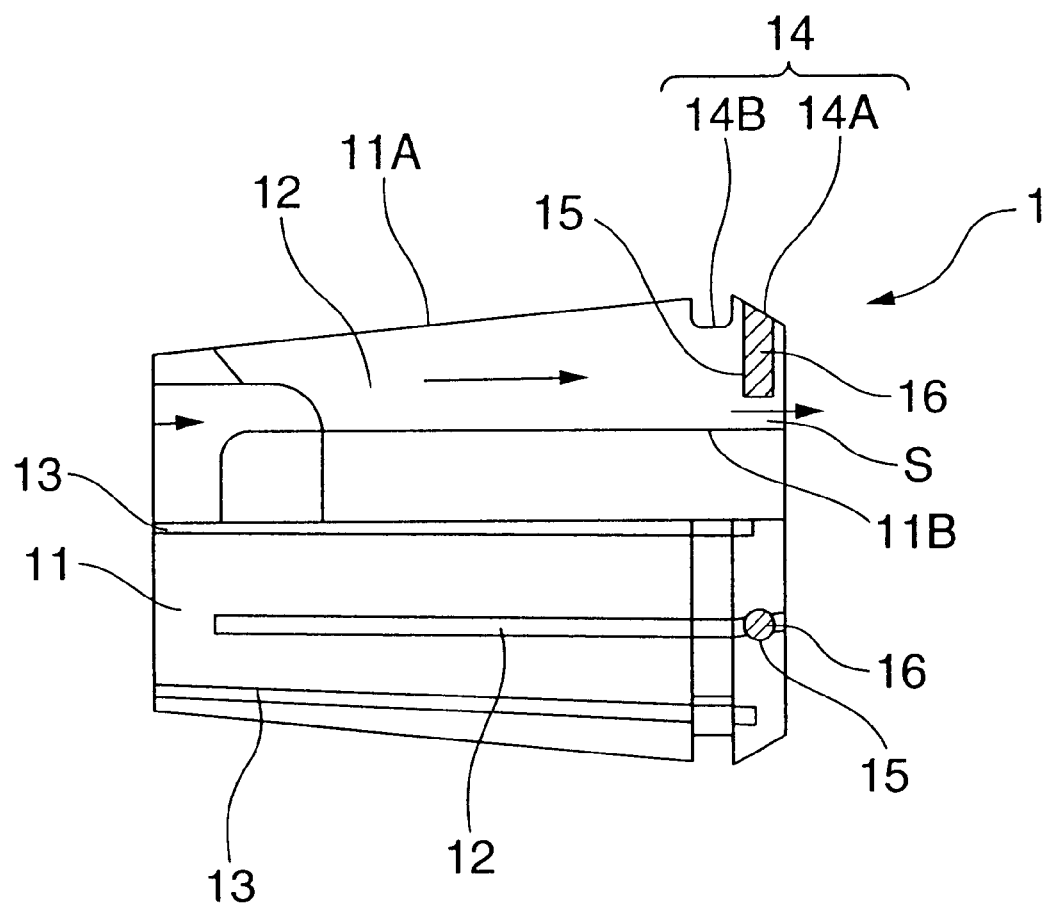
FIG. 3 is a sectional view of the collet taken along line III—III of FIG. 1.
Figure 4:
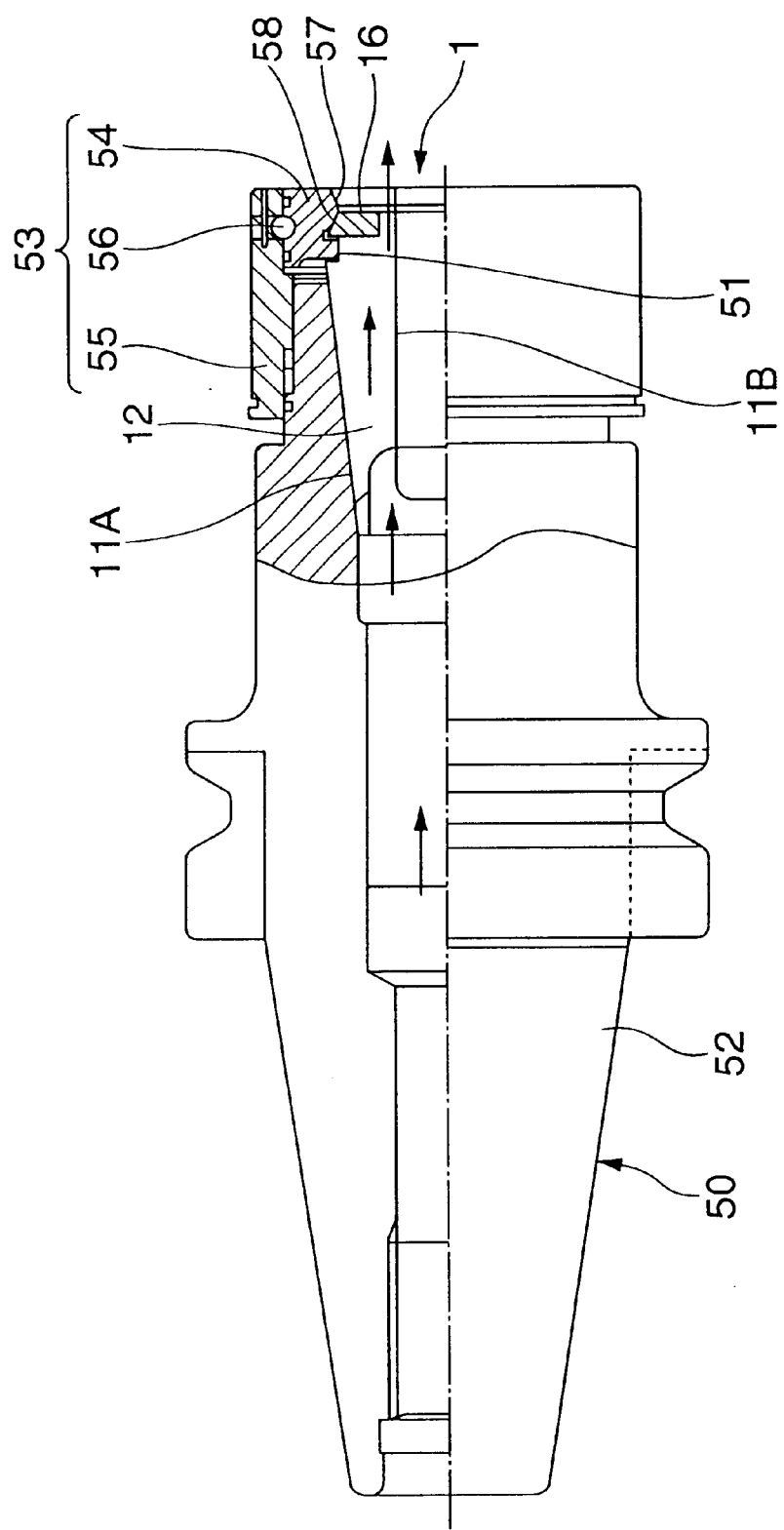
FIG. 4 is a partially sectional view illustrative of the state in which the collet of FIG. 1 is mounted in a collet holder.

FIG. 1 is a side view of a collet according to Embodiment 1 of the present invention. FIG. 2 is a front view of the collet of FIG. 1. FIG. 3 is a sectional view of the collet taken along line III—III of FIG. 1. FIG. 4 is a partially sectional view illustrative of the state in which the collet of FIG. 1 is mounted in a collet holder.

In Embodiment 1, one side of the collet into which the tool is inserted is referred to as the "top-end side," while the other side of the collet is referred to as the "base-end side."

As shown in FIGS. 1 through 4, the collet according to Embodiment 1 is a tapered collet 1 and comprises: a collet body 1 for inserting the shank of a tool; slots 12 formed in the axial direction of the collet body 11 from the top-end side; slots 13 formed in the axial direction of the collet body 11 from the base-end side and between the adjacent slots 12; weir member insertion holes 15 which are connected with the slots 12 and are formed in a nut mounting part 14 of the collet body 11; and weir members 16 inserted into the weir member insertion holes 15.

A total of six slots 12 are formed, which are equally spaced at the same angle (60° in Embodiment 1). Likewise, a total of six slots 13 are formed, which are also equally spaced at the same angle. The tapered collet 1 with these slots 12 and 13 formed therein can expand or contract its own diameter by means of elastic deformation, thereby releasing or holding the shank of the tool.

The nut mounting part 14 comprises a tapered part 14A formed on the top-end side on the outer surface of the collet body 11, and an engaging concave part 14B which is formed on the base-end side of the tapered part 14A and engages with an engaging convex part 51 of a collet holder 50 to be described later in detail.

The weir member insertion hole 15 is made in the tapered part 14A of the nut mounting part 14 so as to be connected with the slot 12, and the weir member insertion hole 15 extends from the outer surface 11A of the collet body 11 toward the inner surface 11B thereof, that is, it is open in the radial direction of the collet body 11. This weir member insertion hole 15 is open and ends at a position recessed from the inner surface 11B of the collet body 11 in a direction closer to the outer surface 11A of the collet body 11 (the weir member insertion hole 15 extends from the outer surface 11A, but does not reach the inner surface 11B). This structure makes it possible to form a gap S for a cooling fluid to pass therethrough between the weir member 16 and the inner surface 11B of the collet body 11.

The weir member 16 is made of an elastic element and is formed in a substantially cylindrical shape that is complementary to the shape of the weir member insertion hole 15. This weir member 16 extends from the same height as that of the outer surface 11A of the collet body 11 or from a position slightly protruding from the outer surface 11A, to the bottom of the weir member insertion hole 15, thereby preventing the cooling fluid from flowing out of the outer surface 11A of the collet body 11. Moreover, the existence of the weir member 16 makes it possible to form the gap S for the cooling fluid to pass therethrough between the inner surface 11B of the collet body 11 and the end face of the weir member 16 facing the inner surface 11B of the collet body 11. The cross-sectional area of the gap S in the radial direction of the collet body 11 can be determined by adjusting the length of the weir member 16, that is, by adjusting a distance from the inner surface 11B of the collet body 11. As a result, it is possible to adjust the flow velocity of the cooling fluid.

Specifically speaking, for example, if the tool held by the collet has a small diameter relative to the outside diameter of the collet body 11, the thickness of the collet body 11 increases, thereby enlarging the cross-sectional area of the slots 12 and 13 in the radial direction. Accordingly, if the amount of the supplied cooling fluid does not change, the flow velocity of the cooling fluid is reduced. In this case, since the cross-sectional area of the gap S in the radial direction can be decreased by increasing the length of the weir member 16, it is possible to maintain a desired speed of the cooling fluid. On the other hand, if the tool held by the collet has a large diameter relative to the outside diameter of the collet body 11, the cross-sectional area of the gap S in the radial direction can be increased by shortening the length of the weir member 16, thereby making it possible to maintain a desired speed of the cooling fluid. In other words, it is possible to easily realize an optimum flow velocity by arbitrarily adjusting the length of the weir member 16.

The collet holder 50 into which the tapered collet 1 is inserted comprises a holder body 52 and a nut part 53 which is provided on the top-end side of the holder body 52 and which fastens and fixes the tapered collet 1 inserted into the holder body 52.

The nut part 53 comprises an engaging member 54 located at the top end of the collet body 11, and a nut 55 which is provided on the outer surface of the engaging member 54 in a manner relatively freely rotatable by means of a coupling ball 56 and which fastens in the radial direction and fixes the tapered collet 1 inserted into the holder body 52.

The engaging member 54 is made of an annular element provided on the top-end side of the holder body 52. At the top-end part of the engaging member 54 on its inner surface, an inclined plane 57 is formed, the inside diameter of which becomes gradually smaller toward the top-end side. On the base-end side of the engaging member 54, an engaging convex part 51 for engaging with the engaging concave part 14B of the tapered collet 1 is formed around the inner surface in a manner protruding toward the shaft center. Between the engaging convex part 51 and the inclined plane 57 is formed an inclined plane 58 that comes into contact with the tapered part 14A formed on the top-end side of the tapered collet 1.

As the nut 55 rotates, the engaging member 54 and the holder body 52 are pressed in their radial direction. Accordingly, the tapered collet 1 is compressed in the radial direction in the same manner, thereby fixing the tool.

In order to insert and mount the tool into the tapered collet 1 having the above-described structure, the shank of the tool is inserted into the top-end side of the tapered collet 1 held by the collet holder 50. The nut 55 is then turned to move the engaging member 54 toward the tapered collet 1 side. Accordingly, the tapered part 14A and the outer surface 11A of the tapered collet 1 slide along and contact the respective inclined planes of the holder body 52 and the engaging member 54, thereby causing the tapered collet 1 to deform elastically in the direction which contracts its diameter and then fastens it to the shank of the tool.

When the collet holder 50 is caused to rotate in this state to process a work by using the tool, as the cooling fluid is supplied from the base-end side of the tapered collet 1, the cooling fluid tends to flow (or be discharged) through the slots 12 toward the top-end side as shown with arrows in FIGS. 3 and 4. Since the weir members 16 are inserted into the top-end side of the collet body 11 at an appropriate depth, the flow velocity of the cooling fluid is controlled (or adjusted) appropriately. As a result, even if the rotation (particularly high-speed rotation) of the tool causes centrifugal force, it is possible to efficiently supply the cooling fluid to the cutting edge of the tool. Moreover, since the weir members 16 are placed in the vicinity of the top-end side of the collet body 11, it is possible to achieve the effect of facilitating the control of the flow direction of the cooling fluid.

Figure 11:
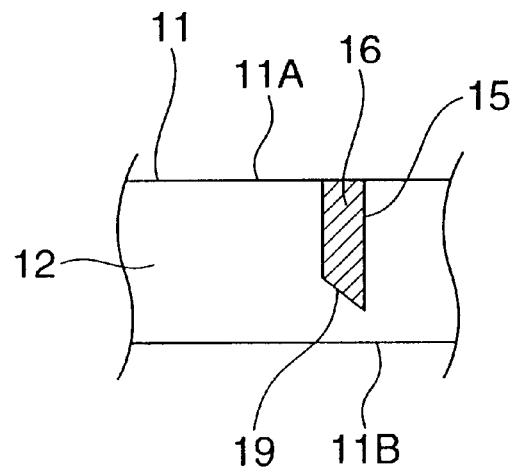
FIG. 11 is a sectional view of a part of a collet according to another embodiment of this invention.

As for the shape of the end face of the weir member 16 on the inner surface 11B side, as shown in FIG. 11, it is possible to form an inclined plane 19 which is inclined from the outer surface 11A to the inner surface 11B toward the top-end side. This structure enables, as a natural consequence, proper control of the flow velocity of the cooling fluid and also makes it possible to achieve the effect of facilitating the flow direction of the cooling fluid. Moreover, it is possible to gradually change the flow velocity of the cooling fluid, thereby causing the cooling fluid to flow more smoothly.

In Embodiment 1, the collet that has six slots 12 and six slots 13 has been described. However, without limitation to such structure, it is possible to arbitrarily decide the number of the slots 12 and 13 as desired. In other words, it is possible to select and use any existing collet.

Moreover, it is possible to construct the collet in such a manner that the width of the slot 12 on the base-end side relative to the weir member 16 is different from that on the top-end side relative to the weir member 16. For example, if the width of the slot 12 on the top-end side is made narrower than that at a position closer to the base-end side than to the weir member 16, the cross-sectional area of the gap S becomes smaller, thereby making it possible to further increase the flow velocity of the cooling fluid. On the other hand, if the width of the slot 12 on the top-end side is made wider than that at a position closer to the base-end side than to the weir member 16, the cross-sectional area of the gap S is made larger, thereby making it possible to further decrease the flow velocity of the cooling fluid. In other words, it is possible to arbitrarily control the speed of the cooling fluid by adjusting the widths of the slot 12 on the base-end side and on the top-end side relative to the weir member 16.

Figure 12:
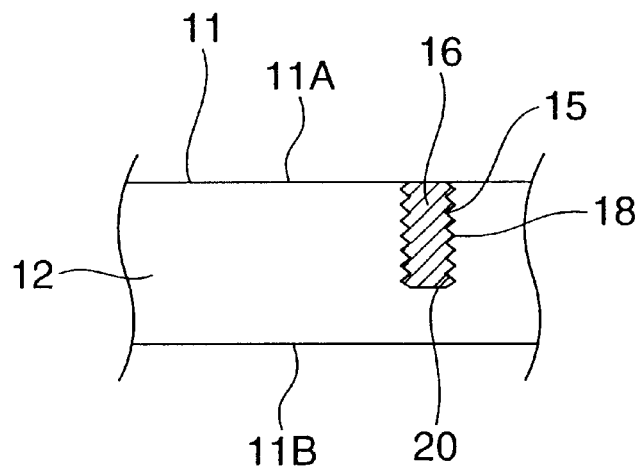
FIG. 12 is a sectional view of a part of a collet according to still another embodiment of this invention.

Furthermore, as shown in FIG. 12, it is possible to form a concavo-convex part 18 on the inner walls of the weir member insertion hole 15 and to form, over the outer surface of the weir member 16, an engaging part 20 which can engage with the concavo-convex part 18. As the weir member 16 is inserted into the weir member insertion hole 15, the concavo-convex part 18 and the engaging part 20 are brought into engagement, thereby making it possible to engage the weir member 16 at a desired position with further certainty.

In Embodiment 1, the case in which the weir member 16 is inserted into the weir member insertion hole 15 has been described. However, without limitation to such structure, it is essential only that the weir member 16 be inserted into the slot 12.

Moreover, the shape of the tapered part 14A of the tapered collet 1 and the engaging member 54 is not limited to the inclined plane, but it may also be a cylindrical shape with a uniform diameter.

(Embodiment 2)

A collet according to Embodiment 2 of this invention is hereinafter described with reference to the relevant drawings.

Figure 5:
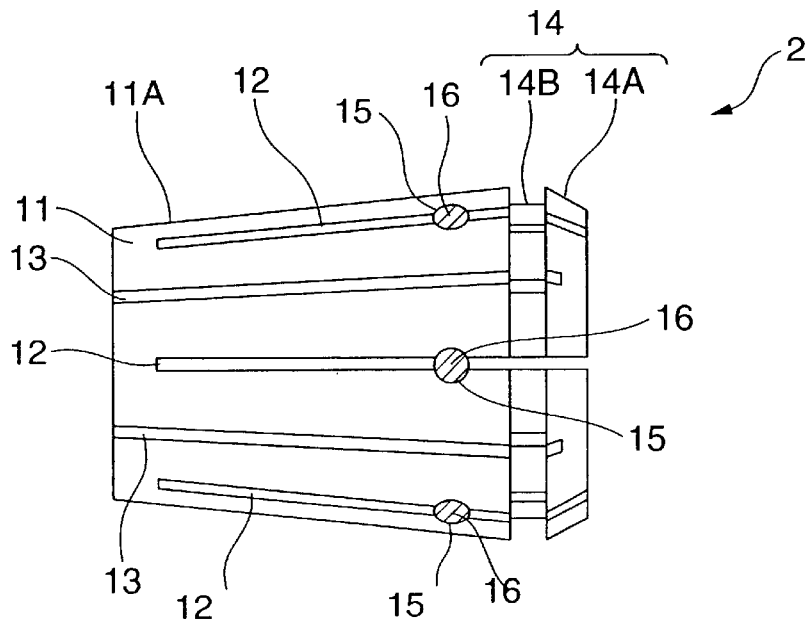
FIG. 5 is a side view of a collet according to Embodiment 2 of this invention.
Figure 6:
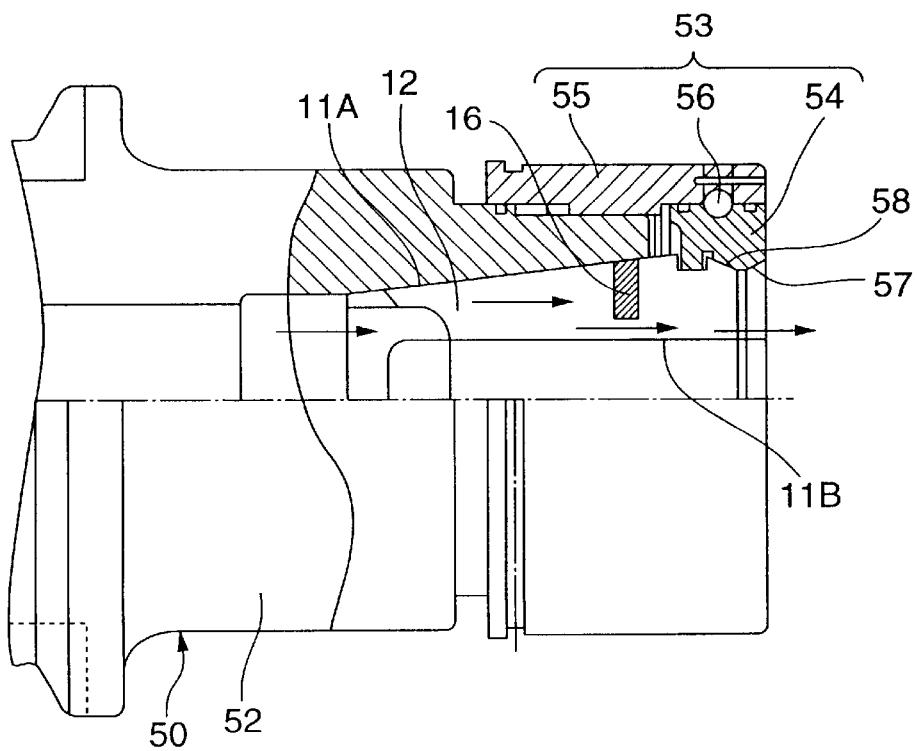
FIG. 6 is a partially sectional view illustrative of the state in which the collet of FIG. 5 is mounted in a collet holder.

FIG. 5 is a side view of a collet according to Embodiment 2 of this invention. FIG. 6 is a partially sectional view illustrative of the state in which the collet of FIG. 5 is mounted in a collet holder. Elements of Embodiment 2 similar to those of Embodiment 1 are given the same reference numerals as in Embodiment 1, and any detailed description thereof is omitted.

As shown in FIGS. 5 and 6, the positions of the weir members 16 are different from in a tapered collet 2 of Embodiment 2 and the tapered collet 1 of Embodiment 1. Specifically, in the tapered collet 2 of Embodiment 2, the weir members 16 are located on the top-end side over the outer surface 11A of the collet body 11.

Concerning the tapered collet 2 having the above-described structure as in the case of the tapered collet 1 of Embodiment 1, when the tool is inserted and the collet holder 50 is then caused to rotate in order to process a work by using the tool, as the cooling fluid is supplied from the base-end side of the tapered collet 2, the cooling fluid tends to flow (or be discharged) through the slots 12 toward the top-end side as shown with arrows in FIG. 6. Since the weir members 16 are inserted into the top-end side of the collet body 11 at an appropriate depth, the flow velocity of the cooling fluid is controlled (or adjusted) properly. As a result, even if the rotation of the tool causes centrifugal force, it is possible to efficiently supply the cooling fluid to the cutting edge of the tool.

The shape of the tapered part 14A of the tapered collet 2 and the engaging member 54 is not limited to the inclined plane, but it may also be a cylindrical shape with a uniform diameter.

(Embodiment 3)

A collet according to Embodiment 3 of this invention is hereinafter described with reference to the relevant drawings.

Figure 7:
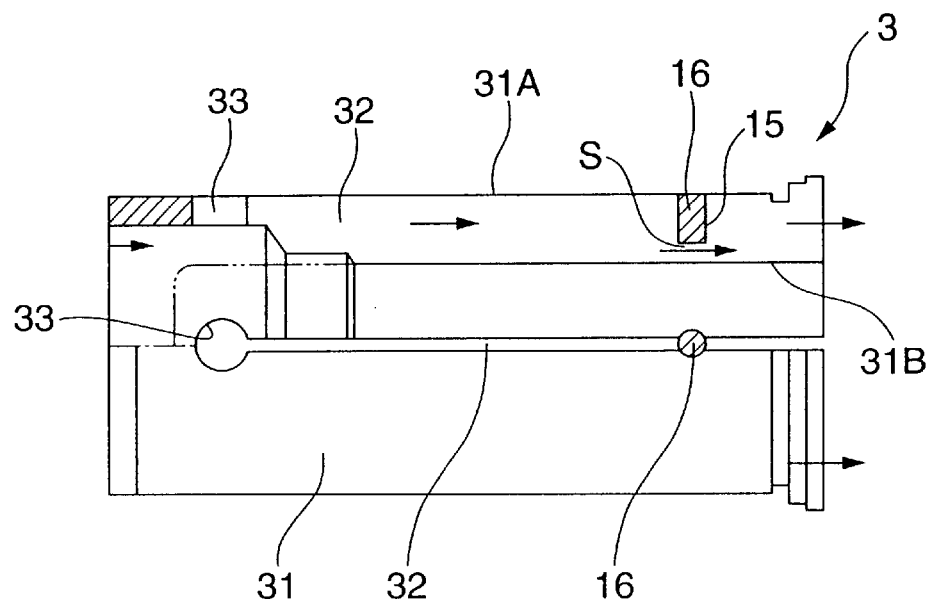
FIG. 7 is a side view of a collet according to Embodiment 3 of this invention.
Figure 8:
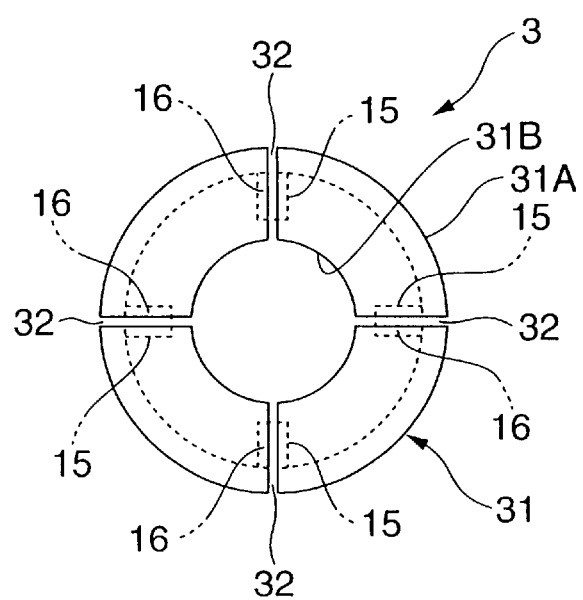
FIG. 8 is a front view of the collet of FIG. 7.

FIG. 7 is a side view of a collet according to Embodiment 3 of this invention. FIG. 8 is a front view of the collet of FIG. 7. Elements of Embodiment 3 similar to those of Embodiments 1 and 2 are given the same reference numerals as in Embodiments 1 and 2, and any detailed description thereof is omitted.

As shown in FIGS. 7 and 8, the collet according to Embodiment 3 is a straight collet 3 inserted into a holder such as a hydraulic chuck or a milling chuck. This straight collet 3 comprises: a collet body 31 for inserting the shank of a tool therein; slots 32 formed in the axial direction from the top-end side of the collet body 31; holes 33 formed on the base-end side of the slots 32; weir member insertion holes 15 formed and connected with the top-end side of the slots 32; and weir members 16 inserted into the weir member insertion holes 15.

A total of four slots 32 are formed, which are equally spaced at the same angle (90° in Embodiment 3). The straight collet 3 with these slots 32 formed therein, just like the aforementioned tapered collets 1 and 2, can expand or contract its own diameter by means of elastic deformation, thereby releasing or holding the shank of the tool.

The holes 33 are connected with all the slots 32 on the base-end side and are open toward the radial direction of the collet body 31. These holes 33 are normally formed in order to relieve stress or the like imposed when the diameter of the straight collet 3 is expanded or contracted.

In the same manner as in the aforementioned embodiments, the weir member insertion hole 15 is connected with the slot 32 and extends from the outer surface 31A of the collet body 31 toward the inner surface 31B thereof, that is, it is open in the radial direction of the collet body 31. This weir member insertion hole 15 is open and ends at a position recessed from the inner surface 31B of the collet body 31 in a direction closer to the outer surface 31A thereof (the weir member insertion hole 15 extends from the outer surface 31A, but does not reach the inner surface 31B). This structure makes it possible to form a gap S for a cooling fluid to pass therethrough between the weir member 16 and the inner surface 31B of the collet body 31.

The weir member 16, as in the aforementioned embodiments, is in a substantially cylindrical shape that is complementary to the shape of the weir member insertion hole 15. The cross-sectional area of the gap S in the radial direction of the collet body 31 can be determined by adjusting the length of the weir member 16. As a result, it is possible to adjust the flow velocity of the cooling fluid.

Concerning this straight collet 3 as in the aforementioned embodiments, when the collet 3 is mounted on a holder such as a hydraulic chuck or a milling chuck (not shown in the drawings) and the collet holder is then caused to rotate in order to process a work by using the tool, as the cooling fluid is supplied from the base-end side, the cooling fluid tends to flow (or be discharged) through the slots 32 toward the top-end side as shown with arrows in FIG. 7. Since the weir members 16 are inserted into the top-end side of the collet body 11 at an appropriate depth, the flow velocity of the cooling fluid is controlled (or adjusted) properly. As a result, even if the rotation of the tool causes centrifugal force, it is possible to efficiently supply the cooling fluid to the cutting edge of the tool.

In Embodiment 3, the collet having four slots 32 formed therein has been described. However, without limitation to such structure, it is possible to arbitrarily decide the number of the slots 32 to be formed as desired. In other words, it is possible to select and use any existing collet.

As for the width of the slot 32, it is possible to arbitrarily control the speed of the cooling fluid by adjusting the width of the slot 32 at a position closer to the base-end side than to the weir member 16 and the width of the slot 32 at a position closer to the top-end side than to the weir member 16 in the same manner as in the aforementioned embodiments.

Figure 13:
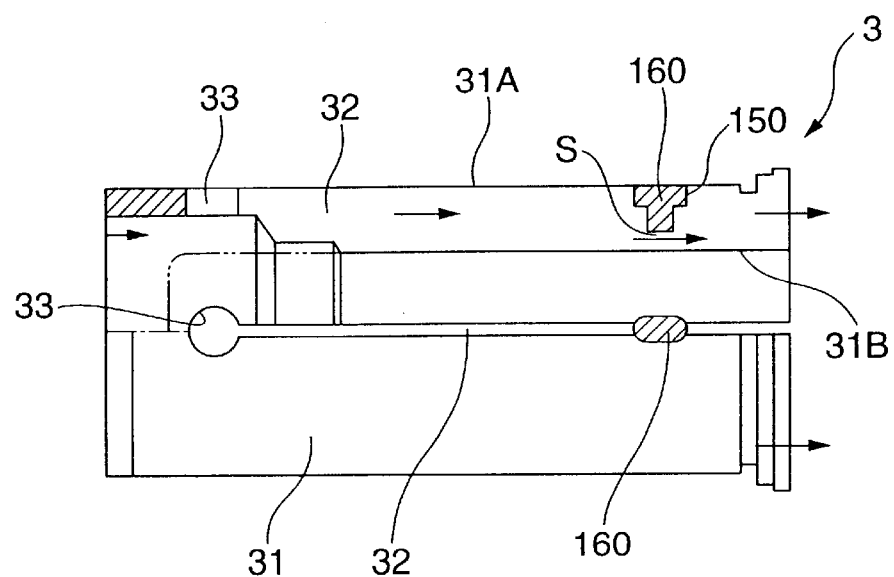
FIG. 13 is a sectional view of a part of a collet according to a further embodiment of this invention.

Moreover, for example, as shown in FIG. 13, a weir member insertion hole 150 may be formed to have a cross section shaped substantially in the letter "T" that consists of a tubular body with a substantially oval plane as seen from above on the outer surface 31A side of the collet body 31, and a cylinder integrated with the tubular body on the inner surface 31B side. In this case, a weir member 160 is constructed to have a cross section shaped substantially in the letter "T" that is complementary to the weir member insertion hole 150.

Figure 14:
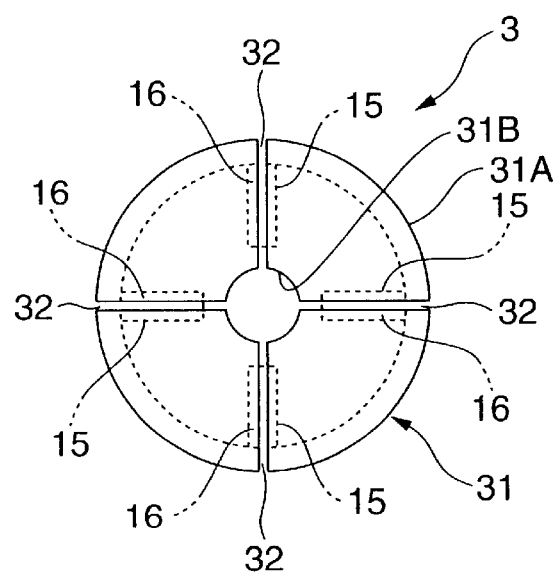
FIG. 14 is a front view of a collet according to still a further embodiment of this invention.

Furthermore, the collet body 31 can be constructed to make its inside diameter small or large, as shown in FIG. 14, according to the diameter of the shank of the tool inserted (or held). In this case, it is possible to decide, as desired, the depth (or the position on the inner surface 31B side) of the weir member insertion hole 15, that is, the position of the end face of the weir member 16 on the inner surface 31B side.

(Embodiment 4)

A collet according to Embodiment 4 of this invention is hereinafter described with reference to the relevant drawings.

Figure 9:
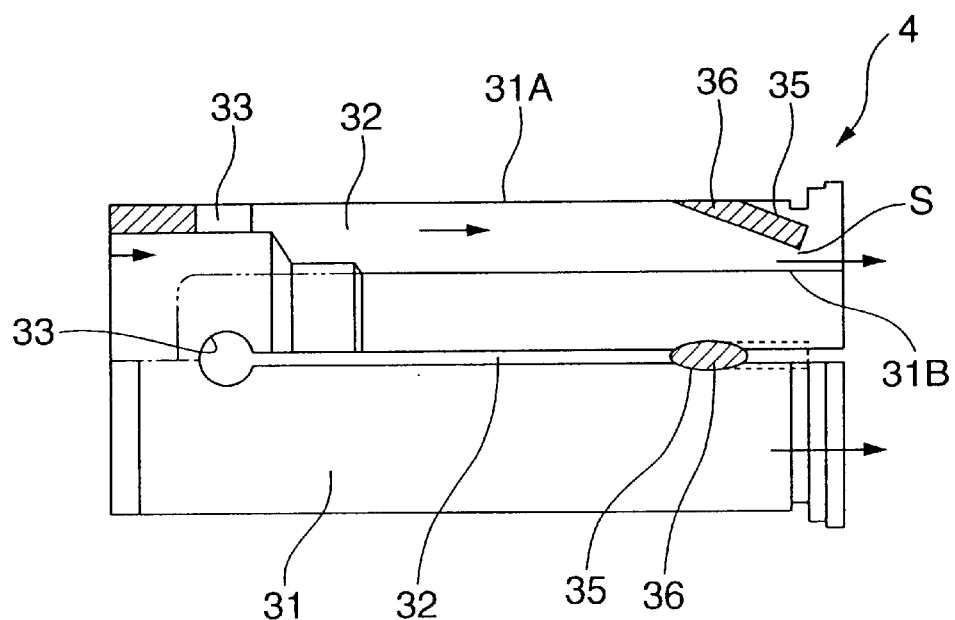
FIG. 9 is a side view of a collet according to Embodiment 4 of this invention.
Figure 10:
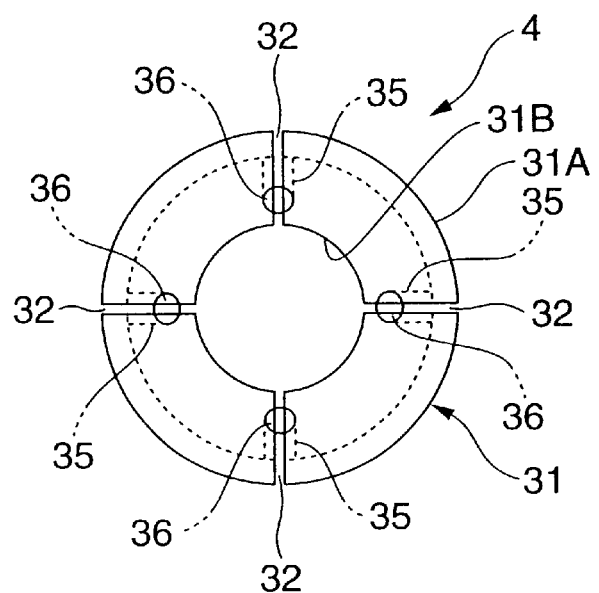
FIG. 10 is a front view of the collet of FIG. 9.

FIG. 9 is a side view of a collet according to Embodiment 4 of this invention. FIG. 10 is a front view of the collet of FIG. 9. Elements of Embodiment 4 similar to those of Embodiment 3 are given the same reference numerals as in Embodiment 3, and any detailed description thereof is omitted.

As shown in FIGS. 9 and 10, a straight collet 4 of Embodiment 4 is different from the straight collet 3 of Embodiment 3 in the shape of weir member insertion holes 35 and the shape of weir members 36 inserted into the weir member insertion holes 35.

The weir member insertion hole 35 of the straight collet 4 of Embodiment 4 is formed with an inclined plane that is inclined from the outer surface 31A of the collet body 31 to the inner surface 31B thereof toward the top-end side. Specifically, this weir member insertion hole 35 is open and ends in the vicinity of the top-end side of the collet body 31, thereby forming a gap S for the cooling fluid to pass therethrough between the weir member 36 and the inner surface 31B of the collet body 31.

The weir member 36 is made of an elastic element and is shaped so as to be complementary to the shape of the weir member insertion hole 35. The minimum cross-sectional area of the gap S in the radial direction of the collet body 31 can be determined by adjusting the length of the weir member 36. As a result, it is possible to adjust the flow velocity of the cooling fluid. By positioning the weir member 36 to incline from the outer surface 31A to the inner surface 31B toward the top-end side, the end face of the weir member 36 on the inner surface 31B side is located even closer to the top end of the collet body 31. Accordingly, as a natural consequence, the flow velocity of the cooling fluid can be controlled properly, and it is also possible to achieve the effect of facilitating the control of the flow direction of the cooling fluid. Moreover, as the weir member 36 is inclined, it is possible to gradually change the flow velocity of the cooling fluid, thereby causing the cooling fluid to further flow out smoothly.

Over the inner surface of the weir member insertion hole 35, a concavo-convex part similar to that in the aforementioned embodiment can be formed. Over the outer surface of the weir member 36, an engaging part similar to that in the aforementioned embodiment can be formed.

Moreover, as for the width of the slot 32 as in the aforementioned embodiments, it is possible to arbitrarily control the speed of the cooling fluid by adjusting the width of the slot 32 at a position closer to the base-end side than to the weir member 36 and the width of the slot 32 at a position closer to the top-end side than to the weir member 36.

As described above, concerning the collet of this invention, the end face of the weir member on the side facing the inner surface of the collet body is located at a position recessed from the inner surface of the collet body in a direction closer to the outer surface thereof, thereby forming a gap between the weir member and the inner surface and allowing the fluid to pass through the gap. Accordingly, it is possible to adjust the flow velocity of the cooling fluid such as the cutting fluid by arbitrarily changing the cross-sectional area of the gap by adjusting the position of the end face of the weir member on the side facing the inner surface of the collet body. As a result, it is possible to efficiently supply the fluid to a desired position of the tool always at optimum flow velocity.

What is claimed is:

1. A collet for holding a tool by inserting the shank of the tool into a center hole of the collet mounted in a tool holder for supplying a fluid to the tool, the collet comprising:
   a collet body for inserting the shank of the tool therein;
   a slot formed at least from the tool insertion side of the collet body; and
   a weir member inserted into the slot;
   wherein the weir member extends from a position recessed from the inner surface of the collet body in a direction closer to the outer surface of the collet body, and a gap for the fluid to flow therethrough is formed between the weir member and the inner surface of the collet body.

2. The collet according to claim 1, wherein the cross-sectional area of the gap in the radial direction of the collet body is determined by adjusting the length of the weir member.

3. The collet according to claim 1, wherein a weir member insertion hole is formed in the slot in the radial direction of the collet body, and the weir member is inserted into the weir member insertion hole.

4. The collet according to claim 1, wherein the cross-sectional area of the gap in the radial direction of the collet body is determined by adjusting the length of the weir member, and
   wherein a weir member insertion hole is formed in the slot in the radial direction of the collet body, and the weir member is inserted into the weir member insertion hole.

5. The collet according to claim 1, wherein at one end of the weir member on the side facing the inner surface of the collet body, an inclined plane is formed which is inclined from the outer surface of the collet body to the inner surface thereof toward the tool insertion side.

6. The collet according to claim 1, wherein the cross-sectional area of the gap in the radial direction of the collet body is determined by adjusting the length of-the weir member, and
   wherein at one end of the weir member on the side facing the inner surface of the collet body, an inclined plane is formed which is inclined from the outer surface of the collet body to the inner surface thereof toward the tool insertion side.

7. The collet according to claim 1, wherein the cross-sectional area of the gap in the radial direction of the collet body is determined by adjusting the length of the weir member,
   wherein a weir member insertion hole is formed in the slot in the radial direction of the collet body, and the weir member is inserted into the weir member insertion hole, and
   wherein at one end of the weir member on the side facing the inner surface of the collet body, an inclined plane is formed which is inclined from the outer surface of the collet body to the inner surface thereof toward the tool insertion side.

8. The collet according to claim 1, wherein a weir member insertion hole is formed in the slot, the weir member insertion hole being inclined from the outer surface of the collet body to the inner surface thereof toward the tool insertion side, and the weir member is inserted into the weir member insertion hole.

9. The collet according to claim 1, wherein the cross-sectional area of the gap in the radial direction of the collet body is determined by adjusting the length of the weir member, and
   wherein a weir member insertion hole is formed in the slot, the weir member insertion hole being inclined from the outer surface of the collet body to the inner surface thereof toward the tool insertion side, and the weir member is inserted into the weir member insertion hole.

10. The collet according to claim 1, wherein the weir member is located in the vicinity of the tool insertion side.

11. The collet according to claim 1, wherein the cross-sectional area of the gap in the radial direction of the collet body is determined by adjusting the length of the weir member, and
   wherein the weir member is located in the vicinity of the tool insertion side.

12. The collet according to claim 1, wherein the cross-sectional area of the gap in the radial direction of the collet body is determined by adjusting the length of the weir member,
   wherein a weir member insertion hole is formed in the slot in the radial direction of the collet body, and
   wherein the weir member is located in the vicinity of the tool insertion side of the weir member insertion hole.

13. The collet according to claim 1, wherein the cross-sectional area of the gap in the radial direction of the collet body is determined by adjusting the length of the weir member,
   wherein a weir member insertion hole is formed in the slot in the radial direction of the collet body, and the weir member is located in the vicinity of the tool insertion side of the weir member insertion hole, and
   wherein at one end of the weir member on the side facing the inner surface of the collet body, an inclined plane is formed which is inclined from the outer surface of the collet body to the inner surface thereof toward the tool insertion side.

14. The collet according to claim 1, wherein the weir member is made of an elastic element.

15. The collet according to claim 1, wherein a weir member insertion hole is formed in the slot, the weir member insertion hole being inclined from the outer surface of the collet body to the inner surface thereof toward the tool insertion side, and the weir member made of an elastic element is inserted into the weir member insertion hole.

16. The collet according to claim 1, wherein the width of the slot at a position closer to the base-end side than to the weir member is different from that at a position closer to the top-end side than to the weir member.

17. The collet according to claim 1, wherein the collet body is made of a straight collet.

18. The collet according to claim 1, wherein the collet body is made of a tapered collet.

19. The collet according to claim 1, wherein the collet body is made of a tapered collet, and
wherein the weir member is located in a nut mounting part of the collet body.

20. The collet according to claim 1, wherein the collet body is made of a tapered collet, and
wherein the weir member is located in a tapered part of the collet body.

* * * * *